United States Patent Office 3,110,558
Patented Nov. 12, 1963

3,110,558
METHOD OF PREPARING PERCHLORATES AND VOLATILE COMPOUNDS CONTAINING OXIDES OF NITROGEN
Meyer M. Markowitz, 146 Morningside Circle, Wayne, Pa., and Paul F. Winternitz, 166 W. 72nd St., New York, N.Y.
No Drawing. Filed Mar. 26, 1958, Ser. No. 724,201
6 Claims. (Cl. 23—85)

The present invention relates to perchlorates and novel methods for their preparation.

Composite powders or propellants used in rocket motors are a physical mixture of fuel and oxidizer. The main requirements for oxidizers used in the above applications are, among others, high oxygen content and suitable physical and chemical properties such as thermal and chemical stability, chemical stability including factors such as the absence of transition points between crystalline modifications imposing limited regions of utility or the possibility of spontaneous decomposition of the propellant. Another, and possibly even more important aspect of chemical stability is the tendency of many oxidizers to be very hygroscopic, i.e., to take up water from the small amounts of moisture always present in the air. Hygroscopic oxidizers lose their effectiveness in relatively short periods of time and therefore these mixtures with fuels become substantially unsuitable as a powder or propellant. For this reason, existing solids oxidizers are a compromise between high oxygen content and suitable physical and chemical properties.

Perchlorates in general contain more active oxygen than the nitrates previously used and are finding, consequently, ever-increasing application as rocket propellants. Perchlorates, however, which contain the ions of light-weight metals generally demonstrate extreme hygroscopicity. Accordingly, the use of perchlorates has been in the past largely limited to such compounds as the ammonium and potassium perchlorates.

Among the perchlorate salts nitrosyl perchlorate ($NOClO_4$) is found to be outstanding because of its very high active oxygen content (greater than 60% by weight). However, the very high free oxygen content of nitrosyl perchlorate is coupled with extreme hygroscopicity and thermal instability. Thus, practical usage of this compound as a rocket propellant has not been regarded as feasible. We have discovered, however, that nitrosyl perchlorate can nevertheless be advantageously-employed as an intermediate in the preparation of other new and more suitable perchlorates which are themselves useful as rocket propellants in the normal manner in which solid rocket propellants are applied by those skilled in the art.

Because the more usual preparatory procedures for perchlorates involve aqueous media, the products obtained will generally be some hydrated form of the perchlorate salt; such hydrates are not ordinarily useful as oxidants.

With the foregoing in mind, we have invented a new method of general applicability for the preparation of perchlorates, thus affording the opportunity to prepare hitherto inaccessible perchlorates or mixtures of perchlorates with superior properties, in order to obtain more efficient powders and propellants.

A new method for the preparation of perchlorates will make available new compounds of this important class of oxidizers.

The usefulness of some new perchlorates or some new mixtures of perchlorates which combine reduced sensitivity to moisture with a free oxygen content equalling or exceeding that of present perchlorates is evident when the wide application of perchlorates for expsosives and propellants is considered.

It is, therefore, an object of the present invention to prepare anhydrous perchlorates or mixtures therefrom by a new method of general applicability.

It is another object of the present invention to prepare new, hitherto unavailable perchlorates containing free oxygen in an amount exceeding that of perchlorates used at present and being at the same time less sensitive to moisture.

It is also an object of the present invention to describe a method for the conversion of nitrosyl perchlorate into nitrosyl halides.

Other objects of our invention will become apparent from the specification presented in the following.

Nitrosyl perchlorate interacts with sodium fluoride to give sodium fluoborate and nitrosyl fluoride according to the equation below:

$$NaF + NOBF_4 \rightarrow NaBF_4 + NOF$$

It has now been discovered by us that a related displacement reaction can be carried out with nitrosyl perchlorate. It has also been discovered by us that both reactions may be performed with any salts containing an anion forming a volatile compound with the nitrosyl group as per the general reaction scheme

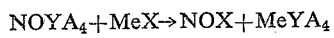

$$NOYA_4 + MeX \rightarrow NOX + MeYA_4$$

where X denotes an anion and Me a cation; NOX is a volatile nitrosyl compound under the experimental conditions, and $MeYA_4$ a solid perchlorate or fluoborate.

The anion, X, may be chloride, bromide, fluoride, nitrate, or any other anion forming a volatile compound with the nitrosyl group.

It has also been found that this method is of very wide applicability. This fact is to be traced to the avoidance of any aqueous solvent, as will be seen from the specific sample preparations given below. It is pointed out that non-metallic perchlorates can be prepared in a similar fashion provided they are of a non-volatile character.

We have also discovered that through employment of our methods it is possible to prepare an aluminum perchlorate which is not hygroscopic to the extent that it does not even dissolve in water and which contains about 60.0% active oxygen.

The following specific examples will serve to illustrate the application of the new method for the preparation of both known perchlorates and new compounds.

In the following experiments mixtures were prepared by thorough grinding of the designated quantities of components in a mortar contained in a nitrogen-flushed dry box. After the resultant samples were left standing at room temperature for 24 hours, they were heated at 50°, 75°, and 100° for four hour periods at atmospheric pressure while being vented through a magnesium perchlorate drying tube. The samples were then heated under vacuum for three hours at 100°, ground and reheated under vacuum for twelve hours at 100°. The results of chemical analyses of the final products are given. Nitrosyl perchlorate was determined by reaction with excess sodium hydroxide and back-titration with standard acid. Except for mixture (2), chlorine as chloride or chlorate was not present. This was concluded after reduction of an acidified water solution of the residue with ferrous sulfate and the non-appearance of a precipitate upon addition of a solution of silver nitrate. Total chlorine was determined by admixture of the sample with anhydrous sodium carbonate, ignition and fusion in a platinum crucible over a gas-air blast lamp, solution in water, and then precipitation of silver chloride.

*Example 1.*—$KNO_3$—$NOClO_4$: 0.3300 g. $KNO_3$ (0.003264 mole) and 0.7824 g. NOClO$_4$ (0.006044 mole) were treated as indicated. Residue composition: total chlorine, 25.20%, NOClO$_4$, 6.85%, giving 91.1% KClO$_4$, and 2.02% KNO$_3$ (by difference).

Example 2.—KCl—NOClO$_4$: 0.3193 g. KCl (0.004283 mole) and 0.5244 g. NOClO$_4$ (0.004051 mole) were treated as indicated. Residue composition: total chlorine, 25.54%, NOClO$_4$, 1.80%, 0.54% chlorine as chloride (determined gravimetrically as silver chloride) equivalent to 1.14% KCl, giving 95.98% KClO$_4$.

Example 3.—KCl—NOClO$_4$: 0.227 g. KCl (0.002853 mole) and 0.6319 g. NOClO$_4$ (0.004881 mole) were treated as indicated. Residue composition: total chlorine, 25.61%, NOClO$_4$, 10.73%, giving 88.58% KClO$_4$.

Example 4.—NaF—NOClO$_4$: 0.3639 g. NaF (0.008665 mole) and 2.1015 g. NOClO$_4$ (0.0623 mole) were treated as indicated. Residue composition: total chlorine, 23.90%, NOClO$_4$, and 16.85% NaF (by difference).

Example 5.—Ba(NO$_3$)$_2$—NOClO$_4$: 0.3262 g. Ba(NO$_3$)$_2$ (0.001248 mole) and 0.5978 g. NOClO$_4$ (0.004618 mole) were treated as indicated. Residue composition: total chlorine, 11.85% NOClO$_4$, 13.04%, giving 39.26% Ba(ClO$_4$)$_2$, and 46.70% Ba(NO$_3$)$_2$ (by difference). Calculated barium content of mixture, 40.58%; found, 39.35% by precipitation as barium sulfate.

Example 6.—AgBr—NOClO$_4$: 0.3098 g. AgBr (0.001650 mole) and 0.4252 g. NOClO$_4$ (0.003284 mole) were heated at ambient pressure for four hours at 50°, eight hours at 75°, ground, heated for four hours at 100°, and then heated for twelve hours under vacuum at 100°, ground and heated for twelve hours vacuum at 100°. Residue composition: 3.77% AgBr determined directly as insoluble material, 48.68% water-soluble Ag (precipitated as silver chloride) giving 93.56% AgClO$_4$, and 2.67% NOClO$_4$ (by difference).

Example 7.—AlCl$_3$—NOClO$_4$: 0.3004 g. AlCl$_3$ .002250 mole) and 1.8039 g. NOClO$_4$ (0.01393 mole) were heated for four hours at 50° C., four hours at 75° C., ground, heated for four hours at 75° C., ground, heated for twelve hours at 79° C., ground, heated under vacuum for four hours at 79° C., ground, heated under vacuum for seven hours at 79° C., ground and then heated for 48 hours under vacuum at 79° C. Residue composition: total chlorine, 26.88%, chlorine as choloride, 2.76%,and aluminum 7.16%. This material was insoluble in water and was found to be non-hygroscopic while maintained at 75% relative humidity for three weeks.

The effectiveness of the displacement reaction, as recognized by us, lies in the large entropy changes accompanying the evolution of the reaction product gases and the overall endothermic nature of the reaction process.

Illustrative of the use of an inert solvent is the preparation of potassium perchlorate from a reaction mixture of nitrosyl perchlorate and potassium chloride. Thus, a finely ground mixture of 0.9974 g. KCl (0.01335 mole) and 2.6772 g. NOClO$_4$ (0.02066 mole) was suspended in 100 ml. of anhydrous carbon tetrachloride, and stirred and refluxed for eight hours at 50° C. The resultant product was filtered and vacuum-dried in a desiccator containing magnesium perchlorate. The solvent was subsequently recovered completely, and was found to contain less than 0.01 weight perment of dissolved material, thus indicating that but a slight degree of reactant solubility is necessary to promote efficient reaction. The final solid product was found to contain no free chloride or chlorate, 12.2% NOClO$_4$, and 87.8% KClO$_4$ (by difference); theoretical yield of KClO$_4$, 1.85 g.; found (by difference), 1.74 g. Because heat is absorbed in the course of conversion, the rate of the reaction is readily susceptible to the control of the experimenter or operator. The gases given off, generally represented as NOX, may prove to be valuable, commercial products per se, easily prepared by means of the displacement reaction. Alternatively, the liberated gases may be incorporated in a cyclic process for the continuous economical preparation of a desired product, MeYA$_4$. Thus, for a perchlorate:

(A)   NOClO$_4$+MeX→MeClO$_4$+NOX
(B)   NOX+HClO$_4$→NOClO$_4$+HX

It is seen that the gas, NOX, liberated by Reaction A may be recycled to produce NOClO$_4$ as in Reaction B, the NOX may then be returned to participate in Reaction A.

*Preparation of Nitryl Fluoride (NO$_2$F)*

NO$_4$F was prepared in accordance with the following reactions:

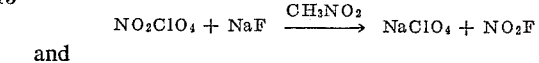

and

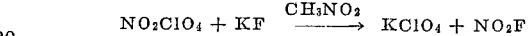

The reactions were carried out in a slurry in CH$_3$NO$_2$ and an excess of NaF or KF was used. The reactants were heated at from about 40° C. to 80° C. and dry N$_2$ was slowly bubbled through the reaction mixture. The products were first scrubbed through a trap kept at −50° C. and then were collected either in a liquid N$_2$-cooled trap or in a frozen n-pentane cooled trap at −133° C.

Yields of 60 to 80 percent were obtained.

*Properties of Product*

|  | Experimental | Theoretical |
| --- | --- | --- |
| Boiling point | −70° C. to −65° C. | −66° C. |
| Freezing point | −132° C. | −135° C. |
|  | (+) F; (+) NO$_2^-$ or NO$_3^-$ | (+) F; +NO$_2^-$ or NO$_3^-$ |

The product, NO$_2$F, was bubbled through aqueous NaOH and resulting solution gave a (+) F$^-$ and (+) NO$_2^-$ or NO$_3^-$ F$^-$ test: Ca$^{++}$ CaF$_2$ Alizarin-red (S)+zirconyl NO$_3$→yellow color NO$_2^-$ or NO$_3^-$: Fe$^{+++}$+H$_2$SO$_4$ resulted in a brown ring. The addition of Nitron resulted in a precipitate.

The gaseous product turned moist blue litmus red, fumed vigorously in air to yield a mist which etched glass (HF), oxidized Hg to a brown substance, reacted with Tygon to form a yellow liquid and was a white powdery solid at −186° C. It is also absorbed by magnesium perchlorate to some extent.

Nitrosyl halides are useful as oxidizer propellants with fuel propellants in rocket motors in the manner customarily applied to the use of fluid propellants in the rocket art. Nitrosyl fluoride is also useful as a fluorinating agent applied in the usual manner already known in the art.

What is claimed is:

1. A method for the preparation of nitryl fluoride consisting of the steps of heating a mixture of nitryl perchlorate and a fluorine salt selected from the group consisting of sodium fluoride and potassium fluoride to a temperature in the range of about 40° C. to about 80° C., entraining the nitryl fluoride with an inert gas and then collecting the nitryl fluoride.

2. The invention set forth in claim 1 with the mixture suspended in a solvent.

3. A method for the preparation of a perchlorate consisting of the steps of heating a mixture of nitrosyl perchlorate and a salt of a metal selected from the group consisting of sodium, potassium, barium, silver and aluminum, to a temperature of at least 50° C. but not higher than about 100° C. for from about four to twelve hours, grinding the reaction mixture, and then heating the reaction mixture for a period of about twelve hours to a temperature from about 79° to about 100° C.

4. A method for the preparation of potassium perchlorate consisting of the steps of suspending in an inert organic solvent nitrosyl perchlorate and potassium chloride, refluxing said suspension in the inert orgaic solvent under stirring for a period of about eight to twelve hours at not less than the boiling point of said solvent but not at a temperature greater than about 100° C. and filtering and drying the resulting solid product.

5. A method for the preparation of a nitrosyl halide consisting of the steps of heating a mixture of nitrosyl perchlorate and a halogen salt containing a metal selected from the group consisting of sodium, potassium, barium, silver and aluminum, under ambient pressure to a temperature of at least 50° C. but not higher than about 100° C. for from about four to about twelve hours, grinding the reaction mixture, and then heating the reaction mixture for about twelve hours to a temperature from about 79° to about 100° C.

6. The invention set forth in claim 5 with the mixture suspended in an inert organic solvent.

References Cited in the file of this patent
UNITED STATES PATENTS 1,310,943    Datta _____ July 22, 1919

OTHER REFERENCES

Beckham et al.: "Chemical Reviews," vol. 48 (1951), pages 348–350.

Gordon et al.: "Canadian Journal of Res.," vol. 18B (1940), pp. 358–362.

Hackenberg et al.: "Zeitschrift für Anorganische und Allgemeine Chemie," vol. 243 (1939), pp. 99–109.

Mellor: "Comprehensive Treatise on Inorganic and Theoretical Chemistry," Supp. II, Part I, page 611 (1956), Longmans, Green & Co., London.

Perrot: "Comptes Rendus," vol. 201 (1935), pp. 275–277.